Aug. 11, 1936.  J. A. ZUBLIN  2,050,988
ROTARY EARTH BORING TOOL WITH ROLLING CUTTERS
Filed March 30, 1936  2 Sheets-Sheet 1

Inventor
John A. Zublin

By J. W. Rodgers
Attorney

Aug. 11, 1936.　　　J. A. ZUBLIN　　　2,050,988
ROTARY EARTH BORING TOOL WITH ROLLING CUTTERS
Filed March 30, 1936　　　2 Sheets—Sheet 2
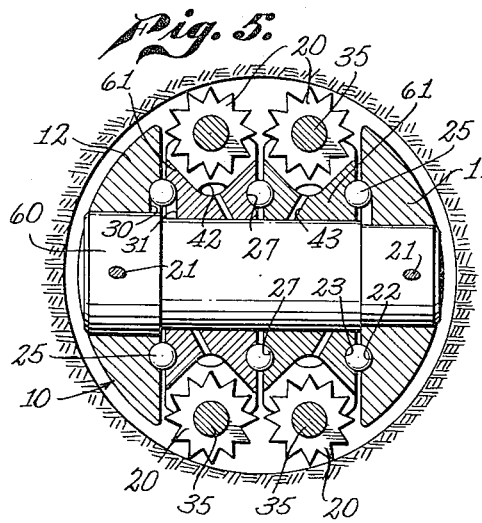
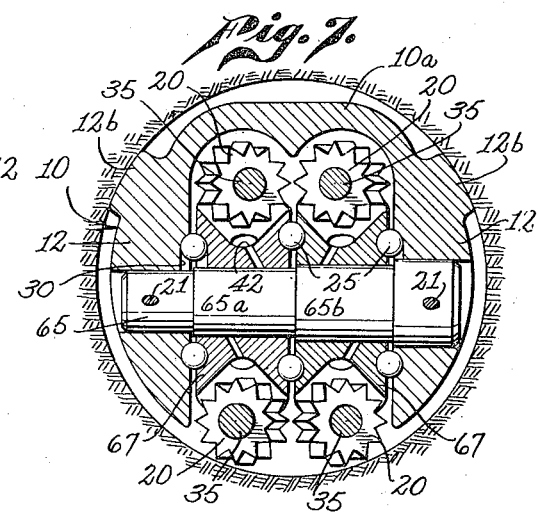
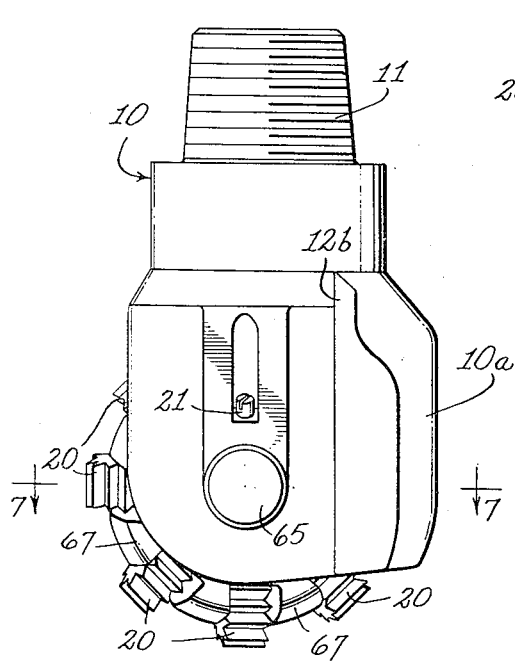
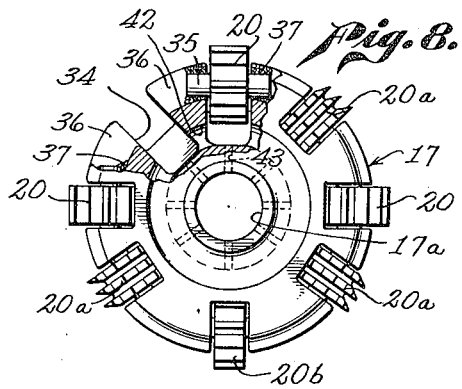
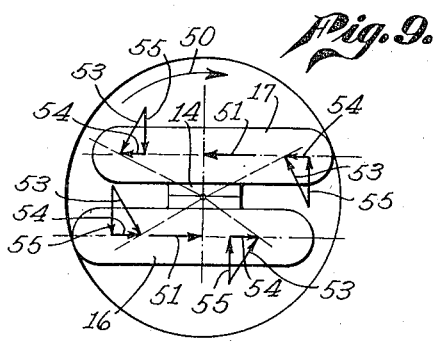
Inventor
John A. Zublin
By J. W. Rodgers
Attorney

UNITED STATES PATENT OFFICE 2,050,988

ROTARY EARTH BORING TOOL WITH ROLLING CUTTERS

John A. Zublin, Los Angeles, Calif.

Application March 30, 1936, Serial No. 71,600

29 Claims. (Cl. 255—71)

The present invention relates generally to rotary earth boring tools such as are used to drill oil wells, but more especially to drill bits having rotating cutters and adapted to penetration of relatively hard formations. A drill bit of a similar kind is shown in my companion application Ser. No. 56,252, entitled "Drill bit with rolling cutters", filed December 26, 1935, and the present invention is also in the nature of an improvement thereon.

For reasons that are well known in the art, successful drill bits for use in rock and other hard formations almost always have rotating cutters since they produce the best kind of drilling motion. However, there are conflicting requirements that make design difficult. For best penetration, it is necessary to have only a minimum portion of the cutters in contact with the formation at any one time, as higher pressure per unit area increases the penetration of the teeth. On the other hand, to keep the cost of drilling within reason by giving a long life to the bit, it is necessary to provide a maximum of cutting teeth on the bit since the drilling life of a bit is generally proportional to the total number and size of cutting teeth available to cut the formation; and an increase in the total number of teeth has usually been accompanied by a like increase in the number of teeth cutting at any one time.

It is thus apparent that the ideal bit has a large total amount of cutting surface but has only a small part of that surface "active", or in drilling contact, at any one time, the remainder of the cutting surface being, in effect, "in reserve", since it also does its share of the cutting after the first "active" portion moves out of contact with the formation. In roller or cone bits of the present type, all the roller or cone cutters are in simultaneous engagement with the formation, so the "reserve" cutting surface is limited to that portion of each cutter not so engaged, and amounts to but a few, perhaps three or four, times the "active" cutting surfaces, whereas both the efficiency and the life of the bit would be increased by increasing the ratio between the reserve and active portions of the cutting surface.

Another disadvantage of the conventional roller or cone bit having but a small number of rolling cutters is that each cutter rolls in the same definite path concentric to the bit axis as the bit is rotated. Since often only one cutter, and rarely more than two cutters, cover a given area, the failure of one or two cutters holds up the entire bit when there is no additional cutter to perform cutting operations in the area covered by the broken rollers or cones.

I have found that when a member rotatable about an axis on a bit is brought into contact with the formation and the bit as a whole is rotated, there is a natural tendency for the member to rotate about its own axis relative to the bit. This natural tendency is strong and positive, and can be used to move cutters into and out of contact with the formation if those cutters are carried on the rotatable member.

Thus it is a general object of my invention both to decrease the amount of active cutting area which is at any one time in cutting position, and to increase the amount of reserve area. These changes have the effect of increasing the speed of penetration, and also of lengthening the bit's life since there is more aggregate cutting surface to be worn.

It is also an object of the invention to provide a bit which not only has the usual reserve cutting area on each cutter, but also has a sufficiently large number of cutters that several entire cutters are in reserve, and, as a whole, are each successively brought into cutting position and then returned to the reserve or non-cutting position. By having entire cutters in reserve, the ratio between "reserve" and "active" portions of the aggregate cutting surface is increased to several times that possible when all cutters are simultaneously in contact with the formation.

A further object of the invention is to provide a bit having a plurality of cutters which are moved over varying paths non-concentric relative to the bore hole center, so that all cutters eventually move across substantially all points on the hole bottom and the complete failure of one cutter does not prevent removal of formation at any point.

Another object is to provide a bit having the above characteristics in which the roller cutters contact the formation with a substantially true rolling motion throughout all, or substantially all, of their engagement with the formation, thus disintegrating the formation with a crushing action.

Another object is to provide a bit in which the cutters are moved successively from cutting position upward to a position where they are cleaned by the circulation fluid and then returned downwardly to the digging position.

It is another principal object of the invention to provide a bit with a plurality of rotatable cutter carriers rotated by their natural tendency to turn when in contact with the formation, the speed and direction of rotation being determined by this natural tendency.

It is another object to provide a bit with a plurality of rotatable cutter carriers rotating in accordance with their natural tendency to turn, the position on the carriers of the cutter axes being such as to advance or retard the rotating speed of the carriers, and also to add a slicing motion to the substantially true rolling motion of the rollers.

And it is a further object to provide a bit with a cutter assembly in which the rolling cutters may be of different widths, spacing, dimensions and shapes and with different numbers of teeth, thus forcing the cutters and their teeth into different paths in order to make tracking difficult and improve cutting efficiency.

These objects are attained in a bit constructed according to my invention by providing the bit shank, which is attached to a drill stem to be rotated thereby about its vertical axis, with one or more, preferably two, wheel-like cutter carriers rotatably mounted on the shank. Each cutter carrier is placed at one side, or substantially so, of the vertical bit axis, and when two carriers are used they are placed on opposite sides of this axis. The carriers rotate about horizontal axes in the preferred forms of my invention, but the axis may be inclined if desired. Around the periphery of each carrier is mounted a plurality of rolling cutters of any suitable type which extend radially beyond the carrier and, as the carrier rotates these cutters are moved into and out of cutting contact with the formation. Through these cutters, the carrier contacts the formation and is turned as a result when the bit is rotated by the drill stem.

In my copending application above mentioned, a similar rotatable cutter carrier is provided with rolling cutters which are so inclined on the carrier that their predisposition to follow a certain path is utilized to turn the carrier even though it be subject to opposing forces by being on opposite sides of the vertical bit axis. By inclining the cutters on the present form of bit, the force they exert to turn the carrier may be added to the natural tendency of the carrier to turn itself, and so increase the rate of its rotation, or by reversing the cutter inclination, this force may be subtracted from the natural rotative tendency and decrease the rate of carrier rotation. The latter position gives a sliding or slicing motion to the cutters that may be desirable under some circumstances. Thus the carriers may be free to turn as they will naturally or they may be influenced by the positioning of the roller cutters.

How the above and other objects and advantages of my invention are attained will be more readily understood by reference to the following description and the annexed drawings, in which:

Fig. 5 is a section similar to Fig. 3 showing a variational form of bit;

Fig. 6 is a side elevation of another variational form of bit;

Fig. 7 is an horizontal section on line 7—7 of Fig. 6 but rotated 90° counterclockwise.

Fig. 8 is a side elevation of a cutter assembly, with one cutter removed and portions broken away to show the construction, provided with a variety of cutter styles and arrangements; and Fig. 9 is a diagram illustrating the forces acting upon the carriers to cause rotation.

Figure 1:
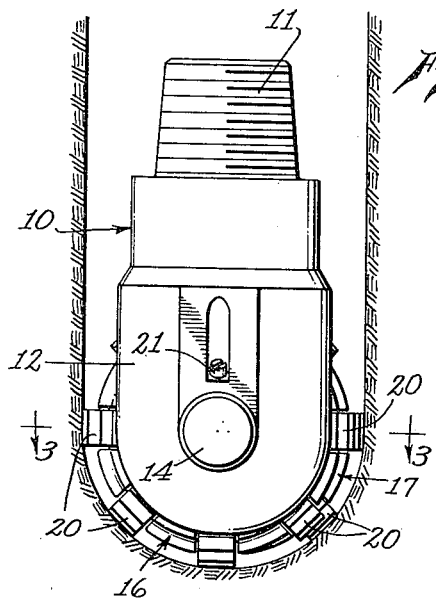
Fig. 1 is a side elevation of a bit constructed in accordance with my invention.

There is shown in Fig. 1 a bit provided with a shank, generally indicated at 10, having on its upper end threaded pin 11 by means of which the shank is attached to a drill stem for rotation thereby about a vertical axis. The lower portion of the shank is formed with two depending legs 12 which carry between them the horizontally extending bearing shaft 14. Rotatably mounted upon shaft 14 are two cutter carriers 16 and 17, and about the periphery of each of these carriers is rotatably mounted a plurality of rolling cutters 20.

Figure 3:
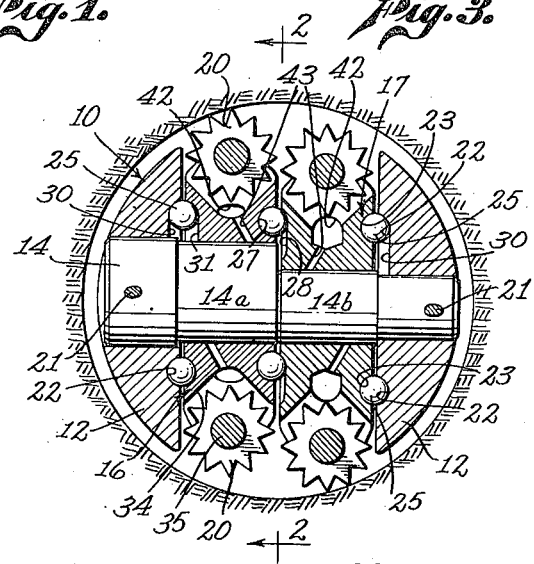
Fig. 3 is an horizontal section of the bit on line 3—3 of Fig. 1, but rotated 90° clockwise.
Figure 2:
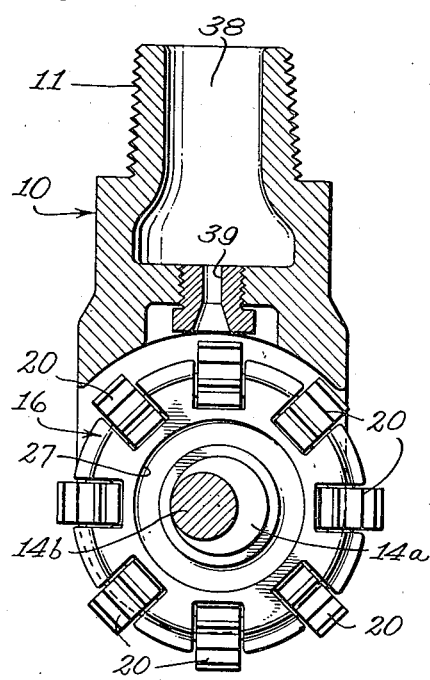
Fig. 2 is a vertical median section through the bit, as on line 2—2 of Fig. 3.

Bearing shaft 14 is preferably non-rotatably mounted in shank legs 12 and forms a bearing about which the generally circular, wheel-like cutter carriers 16 and 17 revolve. These carriers thus revolve about a horizontal axis and lie in a generally vertical plane. Shaft 14 is made with two cylindrical bearing sections 14a and 14b which, as may be seen in Fig. 3, are of different diameters, each of these sections forming a bearing for one of the cutter carriers. The two sections are horizontally eccentric on the bearing shaft so that the axes of revolution of the two carriers are horizontally spaced, the reasons for which will be mentioned later.

Shaft 14 is so shaped that the various diameters of the several sections increase progressively from the smallest at one end to the largest at the opposite end of the shaft. This permits the bearing shaft to be inserted from one side of the bit and pass through the transverse bores in the cutter carriers to the position shown in Fig. 3, after the cutter carriers have been previously assembled and inserted between shank legs 12. The bearing shaft is locked in position by some suitable means, as for example pins 21 at the ends of the shaft. Suitably aligned bores are made in the shank body and in each end of the shaft to receive a pin 21 which is threaded to screw into the shank in order to secure it against removal. These two pins securely lock the shaft against rotation as well as longitudinal displacement.

Bearings are provided to absorb the lateral thrust of the carriers against the shank as well as against each other. Between each carrier and the shank, this thrust bearing comprises an annular groove 22 in the face of shank leg 12 and a corresponding annular groove 23 in the adjoining face of the rotating carrier. These two annular grooves are semi-circular in cross section and together form a ball channel adapted to receive a plurality of ball bearings 25. The two ball channels so formed, one at each leg of the shank, are concentric with the axis of their respective cutter carriers. Between the two carriers, a similar thrust bearing is formed by an annular groove 27 in carrier 16 and a corresponding groove 28 in the other carrier 17. Groove 27 is semi-circular in cross-section while groove 28 is shallower and wider so that balls 25 are held largely in groove 27 and are allowed a radial movement in groove 28 for the distance required by the relative eccentric movement of the two carriers.

When assembling the bit, groove 27 is filled with ball bearings, while carrier 16 is flat, then carrier 17 is placed over the first carrier to hold the balls in place and next the two carriers are inserted between shank legs 12. In order to insert balls 25 into the two outside ball channels, each of the ball channels is provided with a straight, preferably horizontal, groove 30 in the shank leg extending between groove 22 and the central opening receiving shaft 14, and a similar groove 31 is provided in the face of the carrier. These two grooves are the same in size and cross section as grooves 22 and 23 and, when in registration as shown on carrier 16 of Fig. 3, together form a horizontal passage through which balls 25 may freely pass to be inserted into or removed from the ball channel. When groove 31, as a result of rotation of the carrier, is moved out of registry with the stationary horizontal groove 30, as shown on carrier 17 of Fig. 3, the balls are securely locked within the channel and the carriers themselves are held between the two portions of the shank. The subsequent insertion of bearing shaft 14 into position closes the open ends of these horizontal passageways so that even when they are in registration, balls 25 are not able to leave the channel.

Both the replaceable cutter assemblies are as shown in Fig. 8.

Each cutter carrier 16 and 17 comprises a generally circular, wheel-like body formed with a central transverse bore 17a to receive shaft 14, an annular groove in each of the two side faces to form the ball channels described, and a plurality of slots 34 extending inwardly from the carrier periphery and the full width of the carrier body. In each of these slots 34, which are hereinafter referred to as radial slots for ease of identification, is placed a cutter 20 mounted to revolve about an axle pin 35, and projecting radially beyond the carrier with little or no part of it projecting beyond the parallel side faces of the carrier. As may be seen best from Fig. 8, pins 35 are inserted in circumferential notches 36 at either side of the radial slots and are welded into place, as at 37, to complete the cutter assembly. While cutters 20 may be of any suitable shape and diameter, they are preferably substantially cylindrical rollers with axially extending teeth, but they may also have circumferentially extending teeth as at 20a in Fig. 8, or any other suitable teeth. Or, in order to remove any tendency of the cutters to track and to increase cutting efficiency, the cutter assembly may be built with alternate cutters the same and successive cutters different, and the spacing of the rollers may be made non-uniform as on the lower half of the assembly in Fig. 8 and one or more of the cutters may be made narrower than the others as at 20b.

Except in modifications later described, the individual cutters preferably, though not necessarily, revolve about axes perpendicular to the axis of the carrier. This is accomplished by placing pins 35 tangentially about the carrier periphery so that the cutter axes will lie in the plane of revolution of the carrier but do not intersect the axis of carrier revolution.

Figure 4:
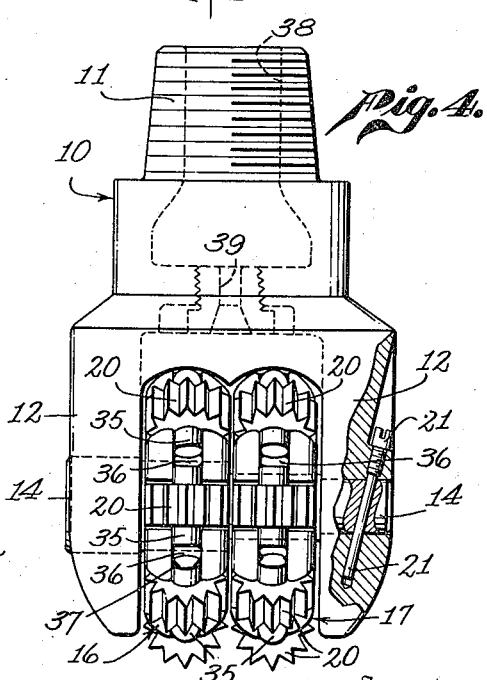
Fig. 4 is an elevation of the bit as viewed from the right of Fig. 1.

The upper end of shank 10 is formed with an internal fluid passage 38 which receives circulation fluid from the drill stem. Fluid from this passage discharges downwardly through nozzle 39 onto the cutters as they pass beneath the nozzle while out of cutting contact with the formation. The nozzle is located centrally of the bit so that its discharge strikes both carriers equally. As shown by Fig. 4, the stream of fluid strikes both sets of cutters mainly at one side of their axes so that the cutters are spun about pins 35 and the fluid reaches all sides of each cutter to insure that the cutters are thoroughly cleaned after each period of contact with the formation.

Circulation around the cutters is increased by passages 42 which connect the bases of successive slots 34 and so form, in effect, a continuous passage around the carrier connecting all the slots so as to carry away circulation fluid from around the cutters as the stream from nozzle 39 cleans them. A number of passages 43 lead from the slots to the central opening 17a in the carrier to carry fluid for lubrication to bearing shaft 14.

As the bit rotates in the well being drilled, the carriers 16 and 17 tend to rotate in opposite directions as a result of their contact, through the cutters, with the well walls. This natural tendency for the carriers to rotate will be understood by those skilled in the art, but will be described briefly in conjunction with Fig. 9 which shows the carriers diagrammatically in a hole being drilled. The condition may be easily visualized if the carriers 16 and 17 and shaft 14 are compared with two loose wheels mounted on an axle. If, while these loose wheels are on a horizontal plane surface, the axle is twisted to turn about a vertical axis intermediate the wheels, the wheels will rotate about the axle as they roll over the surface, and will turn in such a manner that their forward sides move downwardly.

Thus when the bit is rotated clockwise, as indicated by arrow 50, each carrier rotates in a counterclockwise direction as viewed from the outside of the bit, that is, the carriers are moving downwardly on the sides at which the cutters contact the formation. The forces inducing rotation are probably greatest at or near the bottom of the carrier where the rotational forces tend to move the lower side of each carrier in the direction indicated by arrows 51, which it will be noted are opposite to each other and opposite to the direction of rotation of the bit as a whole. Yet all forces on the carrier where cutters contact the formation help the rotation since any such force 53, although it acts perpendicular to the radius at the point of application, can be resolved into two components, one component 54 parallel to and helping the carrier rotation, and one component 55 perpendicular to the carrier rotation. It will be noted that any component 54 acts in the same direction on a carrier as the force 51, and that these components act regardless of whether the carrier contacts the walls of the hole on one or both sides of the bit. Except for the inclination of the cutters, mentioned below, the rotational speed of the carriers depends largely on their mean distance from the vertical axis of the bit.

The two carriers lie on opposite sides of a vertical plane passing through the vertical axis of the bit. The forces 51 and 54 on one side of the plane all act in the same direction, and are opposite to those on the other side of the plane, as shown by the opposite rotation of the two carriers. Each carrier is placed entirely, or substantially entirely, on one side of the vertical bit axis so that forces of opposing tendency will not act on the same carrier; and the two carriers are placed on opposite sides of the axis.

Since each carrier rotates naturally as a result of its disposition to one side of the vertical bit axis, the direction of carrier rotation is always the same when the bit is rotated to the right in the usual manner. With the horizontal eccentricity of shaft 14 as shown in Fig. 3, the carriers are shifted horizontally relative to each other and the cutters on each carrier contact the formation on only one side of the bit, but the two carriers contact on opposite sides of the bit so that each takes the lateral thrust of the other. The cutters operate on the advancing side of the carrier where the motion is downward, but by reversing the direction of eccentricity of shaft 14, the cutters will operate on the trailing side of the carriers where the motion is upward.

Rotation of the carriers brings every cutter into intermittent cutting contact with the formation and the path of each cutter as it rolls over the formation is the spiral resulting from the combined rotation of the bit as a whole and rotation of the carrier on the bit. In the construction shown in Figs. 1–4, each cutter first contacts the formation at a point about horizontally opposite shaft 14 and moves spirally downwardly to a point beneath the bit where it leaves the formation as it moves upwardly. This intermittent movement of the cutters over the formation is repeated as each cutter is brought successively into and out of cutting contact by rotation of the cutter carrier. Of course, if the cutters first contact the formation on the trailing side of the carriers, then the cutter path will be an upwardly directed spiral.

The exact path followed by any given cutter will vary according to the speeds of rotation of the shank and cutter carrier, and may vary more or less continuously. The cutters do not roll on any fixed path concentric with the center of the hole nor do they tend to move along a preceding path so that there is little or no tracking of the cutters; and in any event such a tendency may be eliminated by changing the style, size, or spacing of the individual cutters as mentioned above. The failure or loss of one or two cutters will not stop the bit from drilling since it is only a question of time until other cutters will go over those portions of the hole which would have been cut by the missing cutters had they been present, for all cutters at one time or another reach all portions of the hole.

A variational form of bit embodying these same principles of construction and operation is shown in Fig. 5. In general, the construction of the bit is identical with that described in connection with Figs. 1 to 4; however, the bit of Fig. 5 is designed to provide contact of the cutters on both carriers on both sides of the bit, so that the cutters contact the formation over the entire lower half of the carriers. For this purpose the construction has been changed to provide bearing shaft 60 with a single bearing portion so that the two carriers 61 rotate about coincident axes. Since there is no relatively eccentric movement between the two carriers, the thrust bearing construction may be simplified by eliminating the wide, shallow groove 28 and supplying both carriers with a ball groove 27 on their mutually adjacent faces.

The path of any carrier over the formation will be a spiral as before described, but will also include a second spiral beginning at the bottom of the hole and extending upwardly to a point about level with the shaft 60 where the cutter leaves the formation. Thus the contact of each cutter with the formation in a bit of this type is approximately twice as long as each period of contact of the bit shown in the preceding figures.

Figs. 6 and 7 illustrate another variational form of drill bit which also has the same general construction as the forms heretofore described. Bearing shaft 65 is offset from the vertical bit axis and has two bearing sections 65a and 65b which, although of different diameter, are concentric so that the two carriers 67 rotate about coincident axes, as do carriers 61 in Fig. 5. However, the over-all diameter of carriers 67 is less than that of carriers 61 with the result that the cutters on each carrier contact the formation on only one side of the bit, but both carriers contact the formation on the same side of the bit. Shank body 10 has an extension 10a which connects legs 12 on the back, or non-cutting side of the bit. Each of the legs 12 is provided with a rib 12b which bears against the hole wall on the back side of the bit and takes up the horizontal thrust occasioned by the cutting action of cutters 20.

Although cutters 20 may be mounted upon carriers 67 in the same manner as illustrated in the preceding figures, a variational form of mounting is illustrated in Figs. 6 and 7. Axle pins 35 while still tangential to the cutter carrier, are now inclined to the plane of carrier revolution, instead of being parallel to or lying in said plane. The pins 35 are here shown inclined in what may be called a forward direction since they are inclined in that direction which brings them more nearly perpendicular to the spiral path of the cutter over the formation, or at least a portion of that path. By so inclining these pins, the direction in which the cutters will move with a true rolling motion coincides more nearly with the actual spiral path which they follow as a result of the combined bit and carrier rotation, so that the tendency of the cutters to move in this direction of true rolling motion is taken advantage of to assist or increase the rotation of the carrier about shaft 65.

From this consideration it will be seen that when pins 35 lie in or parallel to the plane of carrier revolution, as in Fig. 5, the axle pins and the cutters thereon are in what may be termed a neutral position, since there is no tendency to assist the rotation of the carrier and yet there is little opposition to it. On the other hand, if the pins are inclined to the plane of carrier revolution oppositely to that shown, they are then in what may be called a backwardly inclined position, since the direction of true rolling motion has been moved farther away from the actual path which the cutters will follow. This results in retarding or slowing up the rate of carrier revolution and causes the cutters to have a greater slicing action, since they must necessarily slide somewhat as they move over the formation. This latter may be desirable in certain types of formations.

In order to prevent assembling the bit with the cutters inclined in the direction other than that intended, shaft 65 has been made with bearing portions of two different diameters, and the ball channels are made of different diameters about the shaft so that the bit can be assembled in only that position which is intended.

From this construction it will be seen in all forms of the bit that not only has each roller only a portion of its teeth active or in cutting engagement at any given time with the remainder of its teeth in reserve or non-cutting position, but that the bit as a whole has only a portion of its cutters active at any one time and has a large reserve of entire cutters which are out of engagement with the formation. The proportion of the total cutters which is active or engaged with the formation will vary with the number of cutters and their placement on the carriers as well as the disposition of the carriers themselves, but in general the proportion of cutters in active engagement with the formation at any time will not exceed one-half of the total number.

Having described various embodiments of my invention, it will be at once apparent that changes may be made in the arrangement and construction of the various parts, and that various other embodiments may be constructed without departing from the spirit and scope of my invention, and therefore the annexed claims are to be construed as illustrative of rather than restrictive upon the broader aspects of my invention.

Attention is directed to my divisional application, Ser. No. 90,799 filed July 15, 1936, in which claims are made to the cutter assembly and its parts.

I claim as my invention:

1. In a rotary earth boring tool, the combination of a shank adapted to be rotated about a generally vertical axis by a drill stem; a cutter carrier rotatably mounted on the shank and disposed substantially entirely to one side of said vertical axis; and a plurality of individual cutters rotatably mounted on the carrier for successive intermittent contact with the formation upon rotation of the carrier.

2. In a rotary earth boring tool, the combination of a shank adapted to be rotated about a generally vertical axis by a drill stem; a cutter carrier rotatably mounted on the shank and disposed substantially entirely to one side of said vertical axis; and a plurality of individual cutters rotatably mounted on the carrier and projecting radially beyond the carrier periphery, said cutters being mounted on the carrier for successive intermittent cutting contact with the formation by rotation of the carrier.

3. In a rotary earth boring tool, the combination of a shank adapted to be rotated about a generally vertical axis by a drill stem; a cutter carrier rotatably mounted on the shank to turn about a horizontal axis and disposed substantially entirely to one side of said vertical axis; and a plurality of individual cutters rotatably mounted on the carrier for successive intermittent cutting contact with the formation upon rotation of the carrier.

4. In a rotary earth boring tool, the combination of a shank adapted to be rotated about a generally vertical axis by a drill stem; a cutter carrier rotatably mounted on the shank and disposed substantially entirely to one side of said vertical axis; and a plurality of individual substantially cylindrical roller cutters rotatably mounted on the carrier for successive intermittent cutting contact with the formation upon rotation of the carrier.

5. In a rotary earth boring tool, the combination of a shank adapted to be rotated about a generally vertical axis by a drill stem; a cutter carrier rotatably mounted on the shank to turn about a horizontal axis and disposed substantially entirely to one side of said vertical axis; and a plurality of individual substantially cylindrical roller cutters rotatably mounted on the carrier for successive intermittent cutting contact with the formation upon rotation of the carrier.

6. In a rotary earth boring tool, the combination of a shank adapted to be rotated about a generally vertical axis by a drill stem; a cutter carrier rotatably mounted on the shank to turn about a horizontal axis and disposed substantially entirely to one side of said vertical axis; and a plurality of individual cutters rotatably mounted on the carrier to turn about axes lying in the plane of revolution of the carrier, said cutters being brought successively into intermittent contact with the formation by rotation of the carriers.

7. In a rotary earth boring tool, the combination of a shank adapted to be rotated about a generally vertical axis by a drill stem; a plurality of cutter carriers rotatably mounted on the shank and each disposed to one side of said vertical axis; and a plurality of individual cutters rotatably mounted on each of the carriers for successive intermittent contact with the formation upon rotation of the carriers.

8. In a rotary earth boring tool, the combination of a shank adapted to be rotated about a generally vertical axis by a drill stem; a plurality of cutter carriers rotatably mounted on the shank to turn about horizontal axes and each disposed to one side of said vertical axis; and a plurality of individual cutters rotatably mounted on each of the carriers for successive intermittent contact with the formation upon rotation of the carriers.

9. In a rotary earth boring tool, the combination of a shank adapted to be rotated about a generally vertical axis by a drill stem; a plurality of cutter carriers rotatably mounted on the shank and each disposed to one side of said vertical axis; and a plurality of individual cylindrical roller cutters rotatably mounted on each of the carriers and projecting beyond the periphery of the carrier, the cutters on each carrier being mounted for successive intermittent contact with the formation upon rotation of the carrier.

10. In a rotary earth boring tool, the combination of a shank adapted to be rotated about a generally vertical axis by a drill stem; a plurality of cutter carriers rotatably mounted on the shank and each disposed to one side of said vertical axis; and a plurality of individual cutters rotatably mounted on each of the carriers to rotate about individual axes perpendicular to the carrier axis, the cutters on each carrier being mounted for successive intermittent contact with the formation upon rotation of the carriers.

11. In a rotary earth boring tool, the combination of a shank adapted to be rotated about a generally vertical axis by a drill stem; a pair of cutter carriers rotatably mounted on the shank and disposed on opposite sides of said vertical axis whereby the carriers revolve in opposite directions; and a plurality of individual cutters rotatably mounted on each of the carriers for successive intermittent contact with the formation upon rotation of the carriers.

12. In a rotary earth boring tool, the combination of a shank adapted to be rotated about a generally vertical axis by a drill stem; a pair of cutter carriers rotatably mounted on the shank to turn about coincident axes and disposed on opposite sides of said vertical axis whereby the carriers revolve in opposite directions; and a plurality of individual cutters rotatably mounted on each of the carriers for successive intermittent contact with the formation upon rotation of the carriers, the contact with the formation of the cutters on both carriers being on one and the same side of the bit.

13. In a rotary earth boring tool, the combination of a shank adapted to be rotated about a generally vertical axis by a drill stem; a pair of cutter carriers rotatably mounted on the shank to turn about coincident axes and disposed on opposite sides of said vertical axis whereby the carriers revolve in opposite directions; and a plurality of individual cutters rotatably mounted on each of the carriers for successive intermittent contact with the formation upon rotation of the carriers, the contact with the formation of the cutters on both carriers being on both sides of the bit.

14. In a rotary earth boring tool, the combination of a shank adapted to be rotated about a generally vertical axis by a drill stem, a pair of cutter carriers rotatably mounted on the shank to turn about individual, horizontally spaced axes and disposed on opposite sides of said vertical axis whereby the carriers revolve in opposite directions; and a plurality of individual cutters rotatably mounted on each of the carriers for successive intermittent contact with the formation upon rotation of the carriers, the contact with the formation of the cutters on each carrier being on one side of the bit opposite to the contact of the cutters on the other carrier.

15. In a rotary earth boring tool, the combination of a shank with a depending leg, means for mounting a cutter carrier rotatably from the shank leg to bear thereagainst, an annular ball channel formed partially in the carrier and partially in the leg, a plurality of ball bearings in the channel, and means for inserting the balls into the channel said means comprising a straight groove in the shank leg leading to the ball channel and a similar groove in the carrier, the two straight grooves, when in registry with each other, forming a passage to the ball channel of sufficient size to permit balls to pass freely, but when not in registry, as a result of rotation of the carrier, locking the balls within the channel.

16. In a rotary earth boring tool, the combination of a stationary shank; a relatively rotatable member; a bearing shaft carried by the shank and upon which the rotatable member is mounted; a bearing structure comprising an annular groove in one face of the shank, a similar annular groove in the adjoining face of the rotatable member, the two annular grooves together forming a channel adapted to receive balls; a plurality of balls in the channel providing a bearing between the shank and the rotatable member; a straight groove in the face of the shank leading from the bearing shaft to the channel; a similar groove in the adjoining face of the rotatable member which, when registering with the straight groove in the shank, forms a passage permitting the balls to pass freely to or from the channel, and when not registering locks the balls within the channel; and the open end of both straight grooves being closed by the shaft when in place.

17. In a rotary earth boring tool, the combination of a shank adapted to be rotated about a generally vertical axis by a drill stem; a plurality of depending legs on the shank; a shaft carried by said legs; a pair of cutter carriers rotatably mounted on the shaft and between the shank legs; an a plurality of balls between the two carriers and between each leg and the adjacent carrier, said balls being held in place by pairs of matching grooves in the faces of the legs and carriers so that the balls form bearings to transmit lateral thrust between the carriers and the shank legs.

18. In a rotary earth boring tool, the combination of a shank adapted to be rotated about a generally vertical axis by a drill stem; a plurality of depending legs on the shank; a shaft carried by said legs; a pair of cutter carriers rotatably mounted on the shaft and between the shank legs, said cutters rotating eccentrically with respect to each other; and balls between the two carriers and between each leg and the adjacent carrier, said balls being held in place by pairs of matching grooves in the faces of the legs and carriers so that the balls form bearings to transmit lateral thrust between the carriers and the shank legs, and one of said grooves holding balls between the carriers being of greater width than the ball diameters to permit revolution of the carriers about eccentric axes.

19. In a rotary earth boring tool, the combination of a shank adapted to be rotated about a generally vertical axis by a drill stem; a cutter carrier rotatably mounted on the shank; a plurality of cutters rotatably mounted about the periphery of the cutter carrier and brought intermittently into and out of contact with the formation by carrier rotation; and a nozzle through which a stream of circulation fluid issues, the nozzle being so located relative to the rotating cutters that the fluid stream spins the cutters about their own axes as the carrier moves them past the nozzle out of contact with the formation.

20. In a rotary drill bit, the combination of a bit shank adapted to be rotated by a drill stem, a cutter carrier rotatably mounted on the shank and disposed substantially to one side of the bit axis, and a plurality of individual cutters rotatably mounted on the carrier for successive intermittent contact with the formation upon rotation of the carrier.

21. In a rotary earth boring tool, the combination of a shank adapted to be rotated about an axis by a drill stem, a cutter carrier rotatably mounted on the shank and disposed substantially to one side of said shank axis, and a plurality of individual cutters rotatably mounted on the carrier for successive intermittent contact with the formation upon rotation of the carrier.

22. In a rotary earth boring tool, the combination of a shank adapted to be rotated about a generally vertical axis by a drill stem; a cutter carrier rotatably mounted on the shank; and a plurality of individual cutters rotatably mounted on the cutter carrier for successive intermittent cutting contact with the formation upon rotation of the carrier.

23. In a rotary earth boring tool, the combination of a shank adapted to be rotated about a generally vertical axis by a drill stem; a cutter carrier rotatably mounted on the shank; and a plurality of individual cutters rotatably mounted on the cutter carrier for successive intermittent cutting contact with the formation upon rotation of the carrier, said cutters projecting radially beyond the periphery of the carrier to contact the formation with a substantially true rolling motion as the shank is rotated about its axis.

24. In a rotary earth boring tool, the combination of a shank adapted to be rotated about a generally vertical axis by a drill stem; a wheel-like cutter carrier with radial slots rotatably mounted in the shank; and a plurality of individual cutters rotatably mounted one in each carrier slot; said cutters extending radially beyond the carrier to successively contact the formation in the plane of revolution of the carrier.

25. In a rotary earth boring tool, the combination of a shank adapted to be rotated about a generally vertical axis by a drill stem; a wheel-like cutter carrier rotatably mounted on the shank; and a plurality of individual cutters rotatably mounted about the periphery of the carrier to successively contact the formation as the carrier revolves, the cutters lying substantially between the side faces of the carrier or their projections.

26. In a rotary earth boring tool, the combination of a shank adapted to be rotated about a generally vertical axis by a drill stem; a cutter carrier rotatably mounted on the shank; and a plurality of individual cutters rotatably mounted on the cutter carrier for successive intermittent cutting contact with the formation upon rotation of the carrier, each cutter having about its periphery teeth which are successively brought into contact with the formation as the cutter rotates about its own axis.

27. In a rotary earth boring tool, the combination of a shank adapted to be rotated about a generally vertical axis by a drill stem; a cutter carrier rotatably mounted on the shank to revolve in a vertical plane about a horizontal axis; and a plurality of individual cutters rotatably mounted on the cutter carrier and brought successively into intermittent cutting contact with the formation by rotation of the carrier.

28. In a rotary earth boring tool, the combination of a shank adapted to be rotated about a generally vertical axis by a drill stem; a cutter carrier rotatably mounted on the shank; and a plurality of individual cutters rotatably mounted on the cutter carrier for successive intermittent cutting contact with the formation upon rotation of the carrier; the carrier and the cutters thereon being all so arranged that less than half the cutters are in contact with the formation at any one time.

29. In a rotary earth boring tool, the combination of a shank adapted to be rotated about an axis by a drill stem, a cutter carrier rotatably mounted on the shank, and a plurality of individual cutters rotatably mounted on the cutter carrier for successive intermittent contact with the formation upon rotation of the carrier.

JOHN A. ZUBLIN.